US010872284B2

(12) United States Patent
Frandsen et al.

(10) Patent No.: US 10,872,284 B2
(45) Date of Patent: Dec. 22, 2020

(54) SMARTCARD

(71) Applicant: ZWIPE AS, Oslo (NO)

(72) Inventors: Jørgen Frandsen, Colorado, CO (US); Devin Snell, Colorado Springs, CO (US)

(73) Assignee: ZWIPE AS, Oslo (NO)

( * ) Notice: Subject to any disclaimer, the term of this patent is extended or adjusted under 35 U.S.C. 154(b) by 0 days.

(21) Appl. No.: 16/490,807

(22) PCT Filed: Mar. 1, 2018

(86) PCT No.: PCT/EP2018/055112
§ 371 (c)(1),
(2) Date: Sep. 3, 2019

(87) PCT Pub. No.: WO2018/158401
PCT Pub. Date: Sep. 7, 2018

(65) Prior Publication Data
US 2020/0005108 A1 Jan. 2, 2020

Related U.S. Application Data

(60) Provisional application No. 62/466,700, filed on Mar. 3, 2017.

(30) Foreign Application Priority Data

Mar. 27, 2017 (GB) .................................. 1704842.2

(51) Int. Cl.
*G06K 19/06* (2006.01)
*G06K 19/07* (2006.01)
(52) U.S. Cl.
CPC ..... *G06K 19/0723* (2013.01); *G06K 19/0709* (2013.01); *G06K 19/0715* (2013.01); *G06K 19/0718* (2013.01)

(58) Field of Classification Search
USPC ........................................................ 235/492
See application file for complete search history.

(56) References Cited

U.S. PATENT DOCUMENTS 6,202,932 B1 * 3/2001 Rapeli ................. G06K 7/0008
235/380
6,636,146 B1 * 10/2003 Wehoski ............ G06K 19/0723
340/10.4

(Continued)

FOREIGN PATENT DOCUMENTS

EP 1441306 A1 7/2004
WO 2016055663 A1 4/2016

OTHER PUBLICATIONS

British Search Report for corresponding application GB1704842.2; Report dated Sep. 25, 2017.

(Continued)

*Primary Examiner* — Jamara A Franklin
(74) *Attorney, Agent, or Firm* — Cantor Colburn LLP

(57) ABSTRACT

A smartcard includes contact pads for electrical connection to an external power source for provision of power to the smartcard in a contact mode of the smartcard, a contactless power harvesting system for provision of power to the smartcard in a contactless mode of the smartcard, and a main circuit on-board the smartcard for receiving and managing the power provided from the contact pads or from the contactless power harvesting system, where the main circuit includes components requiring power in order to provide the smartcard with required functionality, and where the main circuit is connected to the contact pads via a current limiting circuit for controlling the levels of current drawn via the contact pads, the current limiting circuit having an integrator.

18 Claims, 4 Drawing Sheets

(56) References Cited

U.S. PATENT DOCUMENTS

| | | | |
|---|---|---|---|
| 6,955,300 B1 | 10/2005 | Yoshigi | |
| 2002/0022454 A1* | 2/2002 | Serra | H04B 5/0012 455/41.1 |
| 2012/0098508 A1 | 4/2012 | Zhu | |
| 2012/0098580 A1 | 4/2012 | Zhu | |
| 2012/0318875 A1 | 12/2012 | Cho | |
| 2014/0035624 A1 | 2/2014 | Kuenemund | |

OTHER PUBLICATIONS

International Search Report for corresponding application PCT/EP2018/055112 filed Mar. 1, 2018, dated Jun. 7, 2018.
Written Opinion for corresponding application PCT/EP2018/055112 filed Mar. 1, 2018, dated Jun. 7, 2018.

* cited by examiner

SMARTCARD

The present invention relates to a smartcard and to a corresponding method for manufacturing a smartcard.

Smartcards are electronic cards with the ability to store data and to interact with the user and/or with outside devices, for example via contactless technologies such as RFID. These cards can interact with sensors to communicate information in order to enable access, to authorise transactions and so on. Smartcards include, for example, access cards, credit cards, debit cards, pre-pay cards, loyalty cards, identity cards, and so on.

A known feature of these smartcards is a contact pad that can be coupled to corresponding electrical contacts, typically in a terminal or card reader device. The electrical connection with the contact pad can be used for communication of data and also for powering internal circuits on the smartcard. Thus, a financial type smartcard such as a credit or debit card is designed to draw current from the ATM terminal to power its internal logic. This leads to a need for the circuits within the smartcard to be compatible with the ATM terminal circuit (or equivalently with an alternative card reader) and that also allows the smartcard to draw power via the contact pads to meet its internal requirements.

A further known feature of such smartcards is the ability to communicate contactlessly with suitable card readers via RFID technologies and the like. This type of contactless communication is also referred to as Near Field Communication (NFC). In a typical arrangement a powered RFID reader transmits a signal via an antenna. This signal is received by an antenna of the RFID device, comprising a tuned coil and capacitor, and then passed to an RFID chip. The received signal is rectified by a bridge rectifier, and the DC output of the rectifier is provided to control logic circuit that controls the messaging from the chip. Thus, the signal from the reader powers the circuit as well as allowing for backscatter communications in which data can be transmitted from the smartcard to the card reader. Various standard systems exist. The signal is typically 13.56 MHz for MIFARE® and DESFire® systems, manufactured by NXP Semiconductors, but may be 125 kHz for lower frequency PROX® products, manufactured by HID Global Corp.

In order to provide added functions and/or increased there is trend toward having an increased amount of components on the smartcard. As a result then smartcards are requiring increased levels of power as well as having more complicated power characteristics. One example of this is in relation to biometrically authorised smartcards, which are becoming increasingly more widely used and typically require power for an on-board biometric sensor. When the card has the ability to handle both contact and contactless communications then the complexity of the situation increases further. The circuitry on the smartcard must be capable of providing increased levels of power both during contactless power harvesting and also during a physical connection of the card to a terminal via the contact pads. There can be difficulties in implementing a sufficiently high power circuit for power harvesting whilst also managing the interaction between the smartcard and a source of power coupled to the contact pads.

Viewed from a first aspect the invention provides a smartcard comprising: contact pads for electrical connection to an external power source for provision of power to the smartcard in a contact mode of the smartcard; a contactless power harvesting system for provision of power to the smartcard in a contactless mode of the smartcard; and a main circuit on-board the smartcard for receiving and managing the power provided from the contact pads or from the contactless power harvesting system; wherein the main circuit includes components requiring power in order to provide the smartcard with required functionality; and wherein the main circuit is connected to the contact pads via a current limiting circuit for controlling the levels of current drawn via the contact pads, the current limiting circuit comprising an integrator.

In smartcards that have a combination of both contact and contactless modes of operation there will typically be a large capacitance between the two main voltage rails and/or there may be other features of the circuit that result in the possibility of an undesirably large current draw. In a contact power mode the smartcard is physically connected to an external power source that is typically within a card reader such as an ATM terminal. If the smartcard draws too much current via the contact pads then the terminal or reader will take defensive action and may do one of several things such as shut down or disconnect the power from the card slot. The use of a current limiting circuit hence addresses potential problems when a card is plugged into a contact smartcard socket by avoiding undesirably high inrush current.

It is also significant that an integrator is used to implement the current limiting circuit. This provides significant advantages for a smartcard since a suitable current limiting circuit can be implemented using components that can be housed within the restricted thickness of a typical smartcard, such as bank card type smartcards where the thickness is limited to 0.84 mm or less by ISO standards. For example, a suitable integrator can be implemented using a MOSFET or JFET transistor that is available with a sufficiently restricted component height to fit within the smartcard body. The use of an integrator is to be contrasted with other current limiting circuits such as current mirror circuits or other circuits implemented with bipolar transistors. Such circuits cannot use field effect transistors such as MOSFET or JFET components since they cannot be manufactured with sufficiently accurately matched turn-on voltages, unlike bipolar transistors. At the present time sufficiently thin bipolar transistors are not available and therefore these alternative current limiting arrangements are not able to be effectively used for smartcards of restricted thickness. Thus, the smartcard of the first aspect makes use of an integrator in order to allow for the current limiting circuit to have a thinner profile by avoiding the necessity for larger bipolar transistors and allowing for thinner transistors or alternative components such as op-amps to be used instead of bipolar transistors.

The integrator circuit produces an output voltage that rises steadily and hence controls the inrush current. When a voltage from an outside source (e.g. an ATM terminal) is applied to the contact pads then it becomes an input voltage step for the integrator, which causes the steadily rising output voltage. The voltage rises until it reaches the same voltage as the input voltage, and throughout this process the current is limited so as to be within the allowed current for the external power source, i.e. based in the limits of the terminal or reader that the card is connected to when in use. Such an integrator circuit may be implemented using a gain element such as an op-amp or a field effect transistor, for example.

In one example the integrator circuit uses a field effect transistor with its source terminal coupled to a high voltage terminal of the contact pad that is arranged to be connected to a high voltage terminal from the external power source, its gate coupled via a feedback resistor to a low voltage terminal of the contact pad that is arranged to be connected to a low voltage terminal of the external power source (e.g.

to ground), a feedback capacitor connected between the gate and the transistor's drain terminal, and the drain terminal providing voltage to the main circuit on-board the smartcard. Thus, the drain terminal may be connected via a diode to the high voltage rail of the main circuit on-board the smartcard. This integrator can be effectively implemented using MOSFET or JFET components that can be very thin and hence easily housed within the limited thickness of the smartcard. In example embodiments the feedback capacitor and feedback resistor are chosen to create a suitable negative feedback mechanism to keep the current in the feedback capacitor equal to that in the feedback resistor and to limit the current to a level suited to the terminal that the smartcard will be connected to. The feedback capacitor has a greater capacitance than the internal capacitance of the transistor in order to minimise the effect of internal capacitance variations. The presence of the feedback capacitor also minimises the effect of any variation in gain at the transistor. There may be a capacitor connected across the source and gate terminals of the transistor in order to eliminate a spike in current at turn-on.

The main circuit on-board the smartcard may include a large capacitance as noted above. Thus, the main circuit on-board the smartcard may include a capacitor between the main voltage rails in order to store energy during contactless power harvesting. It will be appreciated that this is a feature that may lead to the need for a current limit circuit as set out above since the capacitor would otherwise result in a large inrush current. In an example implementation the connections to the main circuit on-board the smartcard from the contact pads and from the contactless power system are through diodes to isolate the supplies from reverse current flow. The large capacitance for the contactless mode power may be isolated from the contact mode power by a diode. In preferred embodiments the power supplies drive a switching regulator circuit and it is this circuit that requires the large capacitor for switcher efficiency.

The main circuit may include an antenna for the contactless power harvesting system. The antenna may be connected to a rectifier. The contactless power harvesting system may take the form of an RFID device arranged to harvest power from an RFID reader. In this case the RFID device is preferably a proximity integrated circuit card (PICC) and the RFID reader is preferably a proximity coupling device (PCD). The PICC and PCD may comply with the definitions set forth in the international standard ISO/IEC 14443. In some examples the power harvesting may be carried out as described in WO2016/055663.

The main circuit on-board the smartcard may include one or more of: a biometric sensor for obtaining biometric data from a user of the smartcard; a control system for controlling operation of other components on the smartcard; and/or a memory device for storing software and/or data. The biometric sensor may be for checking the identity of a user so that only authorised users can access the functions of the smartcard. In this case the control system may be arranged to restrict access to at least some functions of the smartcard and to permit access to such functions in response to the biometric sensor receiving biometric data corresponding to the biometric data of an enrolled authorised user. The memory device may store data relevant to the functions of the card, such as personalisation data as is typically applied to smartcards. This may include account numbers and the like. The memory device may store biometric data for use in identifying authorised users. Note that the memory device may include a single memory or several separate memories for different purposes. Similarly the control system may be a single control system providing all the required control functionality for the smartcard, or it may be split into various sub-systems using separate software modules and/or separate hardware.

A biometric sensor may be provided on the smartcard for identification of an authorised user of the electronic card. The smartcard may be arranged to be fully operable only when the biometric sensor provides an indication of an authorised user. The smartcard may have secure features that are only accessible to an authorised user, with the biometric sensor providing a way to identify an authorised user.

The biometric sensor may be any suitable type of biometric sensor for obtaining biometric data from the user. In one example the biometric sensor is an EKG sensor. Alternatively or additionally the smartcard may include a biometric sensor in the form of a fingerprint sensor. This may be a capacitive type fingerprint area sensor, for example.

It will be appreciated that a fingerprint sensor as described herein is capable of taking a scan of any digit, including a thumb as well as a finger. It is common in this field to refer mainly to "finger" and to "fingerprint" when it is understood that a thumb/thumbprint could readily be substituted. Hence, any reference herein to a fingerprint sensor and obtaining fingerprint scans/data should be seen as also encompassing the use of a thumb in place of the finger.

The control system may include a fingerprint processor for executing the fingerprint matching algorithm and a memory for storing fingerprint data for enrolled fingerprints. The control system of the smartcard may include multiple processors, wherein the fingerprint processor may be a separate processor associated with the fingerprint sensor. Other processors of the control system and/or elsewhere on the smartcard may include a control processor for controlling basic functions of the smartcard, such as communication with other devices (e.g. via contactless technologies), activation and control of receivers/transmitters, activation and control of secure elements such as for financial transactions and so on. The various processors could be embodied in separate hardware elements, or could be combined into a single hardware element, possibly with separate software modules.

The smartcard may be any type of smartcard, for example an access card, a credit card, a debit card, a pre-pay card, a loyalty card, an identity card and so on. In one example the smartcard is a financial card for interaction with an ATM machine and thus the smartcard may have features known for such financial cards, including a standard size and shape a well as a location for the contact pads that is set based on the configuration of the corresponding contact pads within the ATM machine. In this case the current limit circuit may be designed to avoid exceeding a maximum permitted current draw for the ATM machine, for example the current limiting circuit may be arranged to limit the current drawn via the contact pads to a maximum of 43 mA. As set out in ISO standards a typical current limit for a smartcard at an ATM terminal is 55 mA and 12 mA is required for other aspects of the card/terminal. Thus, the circuit limits the current via the contact pads to 43 mA. The smartcard may be a fingerprint authorisable RFID card.

The smartcard may be a single-purpose smartcard, i.e. a smartcard for interacting with a single external system or network or for interacting with a single type of external system or network, wherein the smartcard does not have any other purpose.

The smartcard preferably has a width of between 85.47 mm and 85.72 mm, and a height of between 53.92 mm and 54.03 mm. The smartcard may have a thickness less than 0.84 mm, and preferably of about 0.76 mm (e.g. ±0.08 mm). More generally, the smartcard may comply with ISO 7816, which is the specification for a smartcard.

The smartcard may be capable of wireless communication as well as wireless power harvesting, such as using RFID or NFC communication to transmit data between the smartcard and a contactless card reader. Typically the wireless communication would use the same system as the contactless power harvesting, most commonly via backscatter communications. The smartcard may be capable of both wireless communication and also wired communication via the contact pad.

Viewed from a second aspect, the invention provides a method for manufacturing a smartcard, the method comprising: providing contact pads for electrical connection to an external device for provision of power to the smartcard in a contact mode of the smartcard; providing a contactless power harvesting system for provision of power to the smartcard in a contactless mode of the smartcard; and providing a main circuit on-board the smartcard for receiving and managing the power provided from the contact pads or from the contactless power harvesting system; wherein the main circuit includes components requiring power in order to provide the smartcard with required functionality; and wherein the main circuit is connected to the contact pads via a current limiting circuit for controlling the levels of current drawn via the contact pads, the current limiting circuit comprising an integrator.

The method may include providing features as discussed above in connection with the first aspect. The method may include selecting components for the current limiting circuit based on the characteristics of external power source, i.e. based on the current limit for a terminal or card reader that the smartcard will be used with, for example selecting the feedback capacitor and/or feedback resistor based on the current limit for the contact pads.

Certain preferred embodiments on the present invention will now be described in greater detail, by way of example only and with reference to the accompanying drawings, in which.

By way of example the invention is described in the context of fingerprint authorised smartcards that include contactless technology and use power harvested from the card reader. It will be appreciated that the advantages of the current limiting circuit of FIG. 2 could also be applied to smartcards without biometric sensors.

Figure 1:
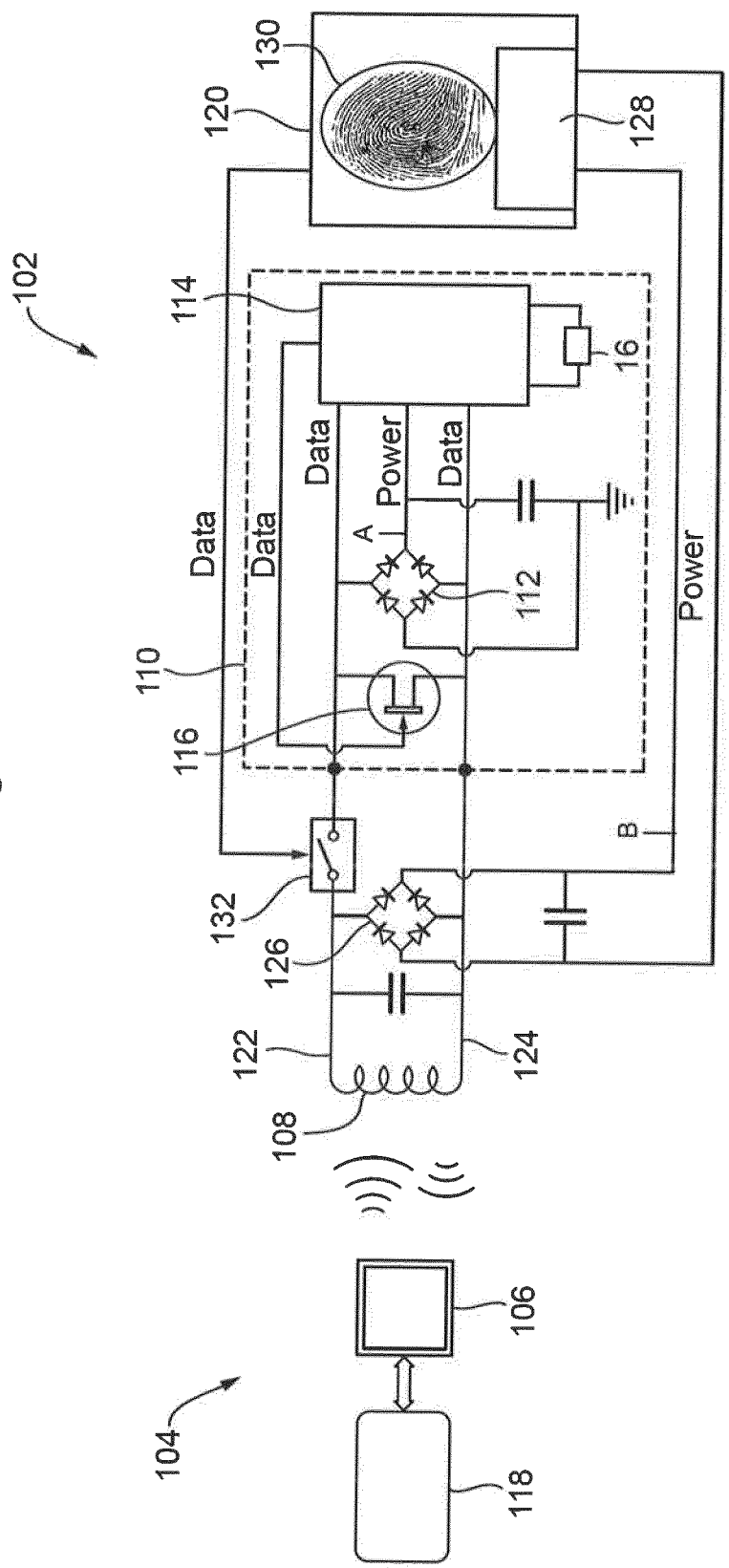
FIG. 1 illustrates a circuit for a smartcard that can be adapted for power provided by contact pads.
Figure 2:
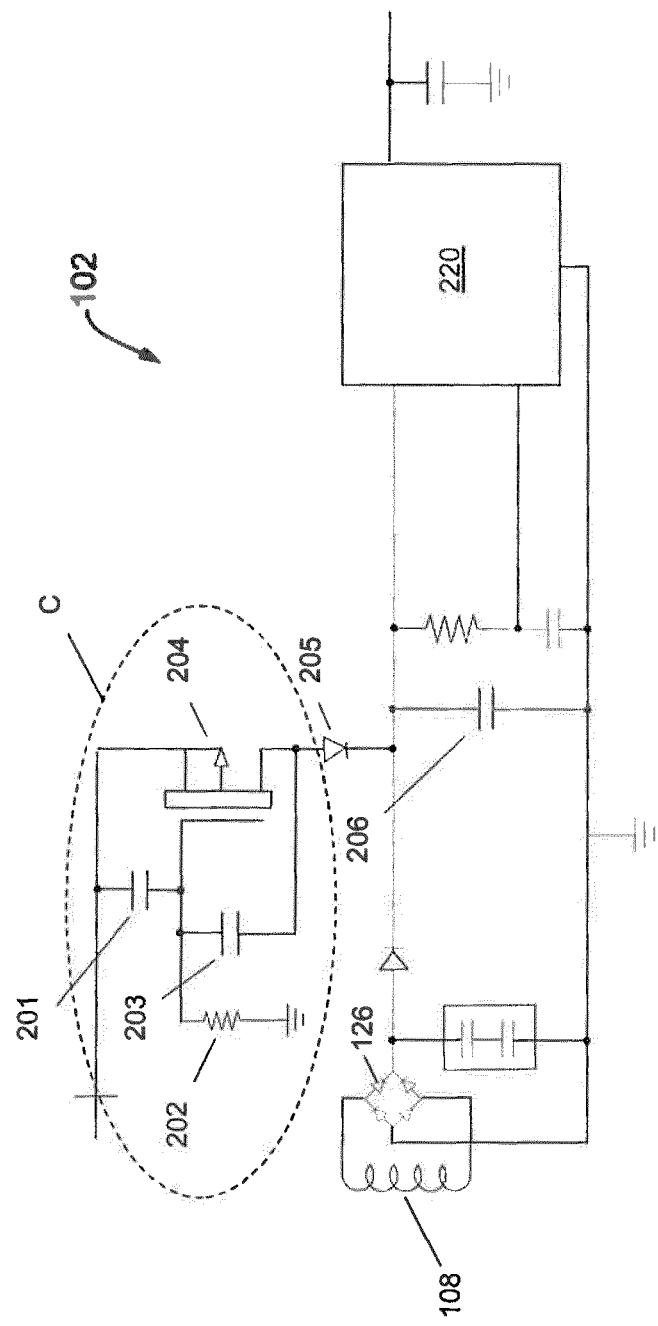
FIG. 2 shows a part of a circuit for a smartcard including a current limiting circuit for connection to contact pads of the smartcard.

FIG. 1 shows the architecture of an example contactless smartcard 102, which can be provided with power from contact pads via a suitable electrical connection to the power lines, for example at A or B. By the addition of a connection to a contact pad via a current limiting circuit then the smartcard 102 of FIG. 1 can operate with either of contactless power harvesting or a contact based power supply. FIG. 2 shows another, slightly simplified, architecture for a smartcard 102 including a current limiting circuit C. This circuit C could be coupled to the main circuit of FIG. 1 to provide the required contact pad connection. The current limiting circuit C and the smartcard 102 depicted in FIG. 2 are explained in more detail below.

The contactless power harvesting system and other possible features of the smartcard 102 will now be explained with reference to FIG. 1. The smartcard 102 is arranged to be used with a powered card reader 104 that transmits a signal via an antenna 106. The signal is typically 13.56 MHz for MIFARE® and DESFire® systems, manufactured by NXP Semiconductors, but may be 125 kHz for lower frequency PROX® products, manufactured by HID Global Corp. This signal is received by an antenna 108 of the smartcard 102, comprising a tuned coil and capacitor, and then passed to a communication chip 110. The received signal is rectified by a bridge rectifier 112, and the DC output of the rectifier 112 is provided to processor 114 that controls the messaging from the communication chip 110.

A control signal output from the processor 114 controls a field effect transistor 116 that is connected across the antenna 108. By switching on and off the transistor 116, a signal can be transmitted by the smartcard 102 and decoded by suitable control circuits 118 in the sensor 104. This type of signalling is known as backscatter modulation and is characterised by the fact that the sensor 104 is used to power the return message to itself.

An accelerometer 16, which is an optional feature, is connected in an appropriate way to the processor 114. The accelerometer 16 can be a Tri-axis Digital Accelerometer as provided by Kionix, Inc. of Ithaca, N.Y., USA and in this example it is the Kionix KXCJB-1041 accelerometer. The accelerometer senses movements of the card and provides an output signal to the processor 114, which is arranged to detect and identify movements that are associated with required operating modes on the card as discussed below. The accelerometer 16 may be used only when power is being harvested from the powered card reader 104, or during power supply via the contact pads.

The smartcard further includes a fingerprint authentication engine 120 including a fingerprint processor 128 and the fingerprint sensor 130. This allows for enrollment and authorisation via fingerprint identification. The fingerprint processor 128 and the processor 114 that controls the communication chip 110 together form a control system for the device. The two processors could in fact be implemented as software modules on the same hardware, although separate hardware could also be used. As with the accelerometer 16 (where present) the fingerprint sensor 130 may be used only when power is being harvested from the powered card reader 104, or during power supply via the contact pads.

The antenna 108 comprises a tuned circuit including an induction coil and a capacitor, which are tuned to receive an RF signal from the card reader 104. When exposed to the excitation field generated by the sensor 104, a voltage is induced across the antenna 108.

The antenna 108 has first and second end output lines 122, 124, one at each end of the antenna 108. The output lines of the antenna 108 are connected to the fingerprint authentication engine 120 to provide power to the fingerprint authentication engine 120. In this arrangement, a rectifier 126 is provided to rectify the AC voltage received by the antenna 108. The rectified DC voltage is smoothed using a smoothing capacitor and then supplied to the fingerprint authentication engine 120.

FIG. 2 shows a broadly similar architecture for a smartcard 102 focused on the power supply and regulation system and in particular including a current limiting circuit C, which as noted above could also be connected to the main circuit of FIG. 1 at point A or B. The main circuit of FIG. 2 has an antenna 108 for supplying contactless power, which is harvested using the capacitor 206 across the two rails of the circuit in a known fashion. The main circuit has a control system 220 for the smartcard. This control system can incorporate the same functionality as the smartcard 102 of FIG. 1, and thus may include components equivalent to the communication chip 110, the processor 114 and the fingerprint authorisation engine 120.

The current limiting circuit C of FIG. 2 forms an integrator using transistor 204, feedback resistor 202 and feedback capacitor 203. A further capacitor 201 is used to limit turn-on currents. The input voltage from the contact pads is connected to the source terminal for the transistor 204, the gate of the transistor 204 is connected via the feedback resistor 202 to the low voltage terminal (i.e. to ground) and the feedback capacitor 203 is connected to the gate and to the drain terminal for the transistor 204. The drain terminal also provides the output voltage for the main circuit of the smartcard 102, and it is connected to the high voltage rail via a diode 205. The integrator produces an output voltage that rises steadily thereby controlling the inrush current in diode 205 and, therefore, also controlling the inrush current from the terminal voltage supply. The circuit C functions adequately with MOSFET components.

When power is first applied the transistor 204 is biased off to allow very little current to pass from the terminal to the smartcard main circuit. The transistor 204 gate to source voltage bias initially steps up due to the applied terminal voltage times the voltage divider formed by the capacitors 201 and 203.

The voltage step is designed to be less than the threshold voltage to keep transistor 204 off. After the voltage step the gate-source voltage continues increasing due to the current flowing in resistor 202 charging the capacitances at the gate. The voltage quickly reaches the turn on threshold and transistor 204 begins to conduct. The output voltage at the drain of the transistor 204 begins rising at a rate that causes sufficient current flow in the feedback capacitor 203 to cancel the current flow in the feedback resistor 202 thus keeping the gate voltage constant. There is a negative feedback mechanism acting to keep the current in the feedback capacitor 203 equal to that in feedback resistor 202. Those skilled in the art will be familiar with such a mechanism. It should be noted that since the gate voltage remains constant then there is no current flowing in any of the other capacitors attached to the gate except for capacitor 203 and the transistors internal gate drain capacitance. During this phase the circuit output voltage continues rising at a steady rate. After a short time, the output voltage will reach the terminal voltage and then stop rising. At this point the current in the feedback capacitor 203 will drop to zero. The gate voltage will then be pulled to zero by resistor 202 and the transistor 204 will be fully turned on.

There is an additional consideration for the circuit design. Under certain conditions the gain element transistor 204 may be transiently turned on causing a brief large current spike. When terminal voltage is applied, a small voltage step occurs across the high gain element input. The step is due to the voltage divider formed by the feedback capacitor 203 and the gain element input capacitance multiplied by the terminal voltage. To eliminate this turn on spike, a capacitor 201 is connected across the gain element input terminals as shown. The capacitance for this capacitor 201 is chosen to ensure the voltage step is smaller than the turn on threshold voltage.

The current limiting circuit C is an integrator. When the terminal voltage is applied, it becomes an input voltage step to the integrator. This causes the output voltage of the integrator to ramp positive. This is well known to those skilled in the art. The output voltage ramp causes a constant current flow in capacitor 206 in the main circuit for the smartcard 102. The voltage continues rising until it has reached the terminal voltage and transistor 204 is fully on.

Due to the feedback capacitor, 203 the circuit is immune to gain element variations. The feedback capacitor 203 is chosen to be greater than the internal gain element capacitance of the transistor 204 to minimize effects of internal capacitance variations. The variation of the gain of the high gain element has minor effects due to feedback capacitor 203. The circuit is therefore relatively robust to the variations of characteristics of the high gain element, and this allows for great flexibility in selecting the type of gain element. In particular MOSFET or JFET transistors may be used despite their low performance in terms of voltage threshold or gain matching. Higher performing bipolar transistors could also be used, but for the purposes of the current example a MOSFET or JFET transistor is selected due to the potential for small size, which has advantages in relation to the size and thickness restrictions for a smartcard. The integrator circuit could alternatively be implemented using an op amp as the gain element.

Figure 3:
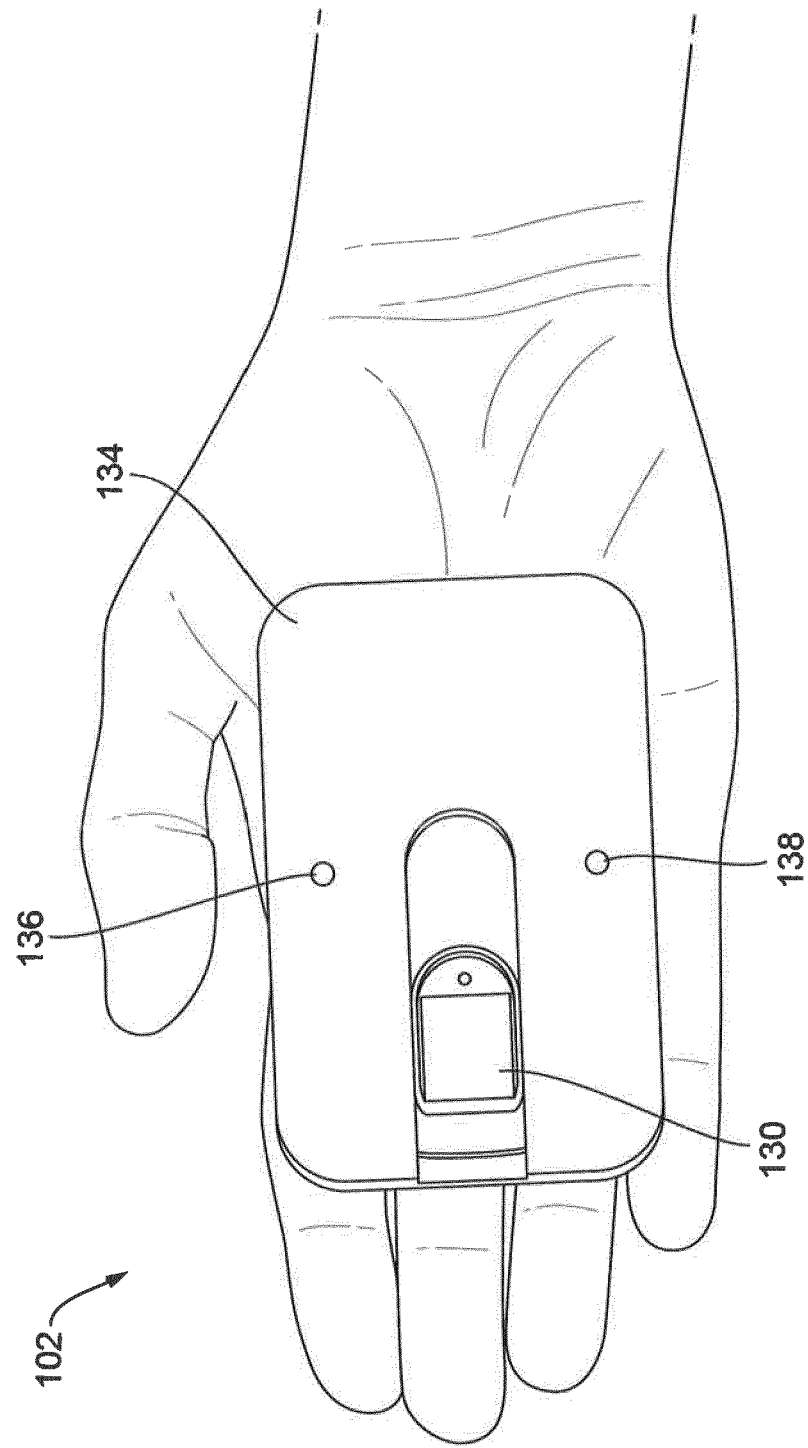
FIG. 3 shows an example of a smartcard with an external housing.
Figure 4:
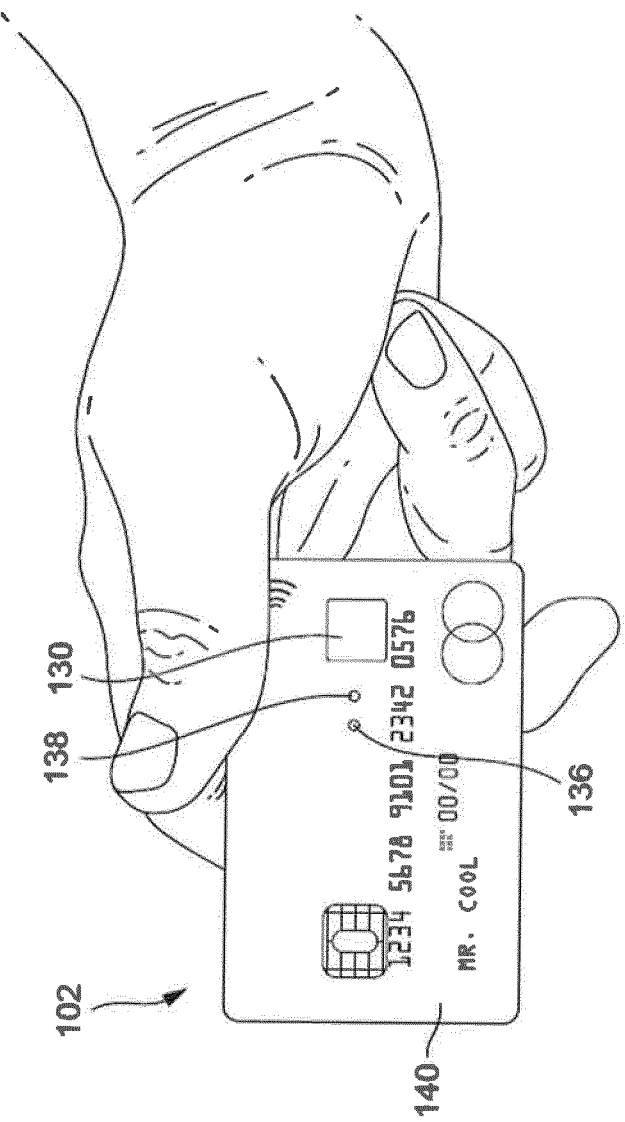
FIG. 4 shows an example laminated type smartcard.

The example smartcard 102 uses a fingerprint sensor 130 as noted above. The fingerprint sensor 130 may be an area fingerprint sensor 130 mounted on a card housing 134 as shown in FIG. 3 or fitted so as to be exposed from a laminated card body 140 as shown in FIG. 4. The card housing 134 or the laminated body 140 encases all of the components of FIG. 1 or FIG. 2, and is sized similarly to conventional smartcards.

The fingerprint authentication engine 120 is arranged to scan a finger or thumb presented to the fingerprint sensor 130 and to compare the scanned fingerprint of the finger or thumb to pre-stored fingerprint data using the processor 128. A determination is then made as to whether the scanned fingerprint matches the pre-stored fingerprint data. In a preferred embodiment, the time required for capturing a fingerprint image and authenticating the bearer of the card 102 is less than one second.

If a fingerprint match is determined then the processor takes appropriate action depending on its programming. In one example the fingerprint authorisation process is used to authorise the use of the smartcard 104 with the contactless card reader 104 or via contact pads. Thus, the communication chip 110 can be authorised to transmit a signal to the card reader 104 when a fingerprint match is made. The communication chip 110 transmits the signal by backscatter modulation, in the same manner as the conventional communication chip 110. The card may provide an indication of successful authorisation using a suitable indicator, such as the LED 136.

The invention claimed is:

1. A smartcard comprising:
   contact pads for electrical connection to an external power source for provision of power to the smartcard in a contact mode of the smartcard;
   a contactless power harvesting system for provision of power to the smartcard in a contactless mode of the smartcard; and
   a main circuit on-board the smartcard for receiving and managing the power provided from the contact pads or from the contactless power harvesting system;
   wherein the main circuit includes components requiring power in order to provide the smartcard with required functionality; and
   wherein the main circuit is connected to the contact pads via a current limiting circuit for controlling the levels of current drawn via the contact pads, the current limiting circuit comprising an integrator.

2. A smartcard as claimed in claim 1, wherein the integrator is implemented using am op amp, a MOSFET or a JFET.

3. A smartcard as claimed in claim 1, wherein the main circuit and the current limit circuit consist of components with a height of less than 0.84 mm in order to be housed within a smartcard body with thickness of less than 0.84 mm.

4. A smartcard as claimed in claim 1, wherein the integrator circuit produces an output voltage that rises steadily and hence controls the inrush current with the current being limited so as to be within an allowed current defined by a maximum current for a terminal or reader that the card is intended to be connected to.

5. A smartcard as claimed in claim 1, wherein the integrator circuit uses a field effect transistor with its source terminal connected to a high voltage terminal of the contact pad for connection to a high voltage terminal of the external power source, its gate arranged to be coupled via a feedback resistor to a low voltage terminal of the contact pad for connection to a low voltage terminal of the external power source, a feedback capacitor connected between the gate and the transistor's drain terminal, and the drain terminal providing voltage to the main circuit on-board the smartcard.

6. A smartcard as claimed in claim 5, wherein the feedback capacitor has a greater capacitance to dominate the internal capacitance of the transistor.

7. A smartcard as claimed in claim 5, comprising a capacitor connected across the source and gate terminals of the transistor to dominate the internal capacitance of the transistor in order to eliminate a spike in current at turn-on.

8. A smartcard as claimed in claim 7, wherein the capacitance of the capacitor connected across the source and gate terminals of the transistor and the capacitance of the feedback capacitor are chosen to prevent the initial gate source voltage from rising above the turn on threshold voltage.

9. A smartcard as claimed in claim 1, wherein the main circuit on-board the smartcard includes a capacitance between the main voltage rails in order to store energy during contactless power harvesting.

10. A smartcard as claimed in claim 1, wherein the main circuit on-board the smartcard includes one or more of: a biometric sensor for obtaining biometric data from a user of the smartcard; a control system for controlling operation of other components on the smartcard; and/or a memory device for storing software and/or data.

11. A smartcard as claimed in claim 1, including a biometric sensor on the smartcard for identification of an authorised user of the electronic card, wherein the smartcard is arranged to be fully operable only when the biometric sensor provides an indication of an authorised user.

12. A smartcard as claimed in claim 1, wherein the smartcard is an access card, a credit card, a debit card, a pre-pay card, a loyalty card and/or an identity card.

13. A smartcard as claimed in claim 1, wherein the smartcard is a financial card for interaction with an ATM machine.

14. A smartcard as claimed in claim 1, wherein the current limiting circuit is arranged to limit the current drawn via the contact pads to a maximum of 43 mA.

15. A smartcard as claimed in claim 1, the smartcard having a width of between 85.47 mm and 85.72 mm, a height of between 53.92 mm and 54.03 mm and a thickness less than 0.84 mm.

16. A method for manufacturing a smartcard, the method comprising:
providing contact pads for electrical connection to an external power source for provision of power to the smartcard in a contact mode of the smartcard;
providing a contactless power harvesting system for provision of power to the smartcard in a contactless mode of the smartcard; and
providing a main circuit on-board the smartcard for receiving and managing the power provided from the contact pads or from the contactless power harvesting system;
wherein the main circuit includes components requiring power in order to provide the smartcard with required functionality; and
wherein the main circuit is connected to the contact pads via a current limiting circuit for controlling the levels of current drawn via the contact pads, the current limiting circuit comprising an integrator.

17. A method as claimed in claim 16, comprising providing the smartcard with features as claimed in claim 2.

18. A method as claimed in claim 16, comprising selecting components for the current limiting circuit based on the external power source that the smartcard will be used with.

* * * * *